(12) United States Patent
Gallien

(10) Patent No.: US 7,175,149 B2
(45) Date of Patent: Feb. 13, 2007

(54) ANTI-TIPOVER DEVICE

(75) Inventor: James M. Gallien, Hidden Hills, CA (US)

(73) Assignee: Hangman Products, Inc., Woodland Hills, CA (US)

(*) Notice: Subject to any disclaimer, the term of this patent is extended or adjusted under 35 U.S.C. 154(b) by 270 days.

(21) Appl. No.: 10/984,275

(22) Filed: Nov. 9, 2004

(65) Prior Publication Data

US 2006/0097123 A1 May 11, 2006

(51) Int. Cl.
*A47B 97/00* (2006.01)
(52) U.S. Cl. .............. 248/500; 248/499; 292/288; 292/289
(58) Field of Classification Search ............ 248/551, 248/680, 500, 498, 493, 489, 552, 553; 312/245; 292/264, 288, 289, 291, 300, 302
See application file for complete search history.

(56) References Cited

U.S. PATENT DOCUMENTS

| | | | | |
|---|---|---|---|---|
| 2,805,093 | A * | 9/1957 | Van Den Thoorn | 292/264 |
| 4,027,908 | A * | 6/1977 | Crepinsek | 292/264 |
| 5,174,543 | A | 12/1992 | Corson et al. | |
| 6,135,693 | A * | 10/2000 | Leitzke et al. | 411/530 |
| 6,220,562 | B1 * | 4/2001 | Konkle | 248/500 |
| D512,903 | S * | 12/2005 | Gallien | D8/349 |

FOREIGN PATENT DOCUMENTS

| | | | |
|---|---|---|---|
| CA | 2312680 | * | 12/2000 |
| JP | 8-275837 | * | 10/1996 |

OTHER PUBLICATIONS

Top Supplies, Inc.; Safety Bracket.
Marlyco, Inc. dba Trevco; Steel Furniture Cable.

* cited by examiner

*Primary Examiner*—Gwendolyn Baxter
(74) *Attorney, Agent, or Firm*—Stetina Brunda Garred & Brucker

(57) ABSTRACT

An anti-tipover device for retaining an object adjacent a structure, the anti-tipover device comprising an elongate flexible link element including opposing first and second end sections, the first and second end sections defining first and second longitudinal axes, respectively; first and second pin elements defining first and second rotational axes, respectively, the first and second pin elements being coupled to the respective ones of the first and second end sections with the first and second rotational axes disposed perpendicular to the respective ones of the first and second longitudinal axes, the first and second pin elements being sized and configured with the first and second end sections being pivotable about the respective ones of the first and second pin elements; first and second cable retaining members being attached to the respective ones of first and second pin elements and being mountable to the respective ones of the object and structure.

20 Claims, 2 Drawing Sheets

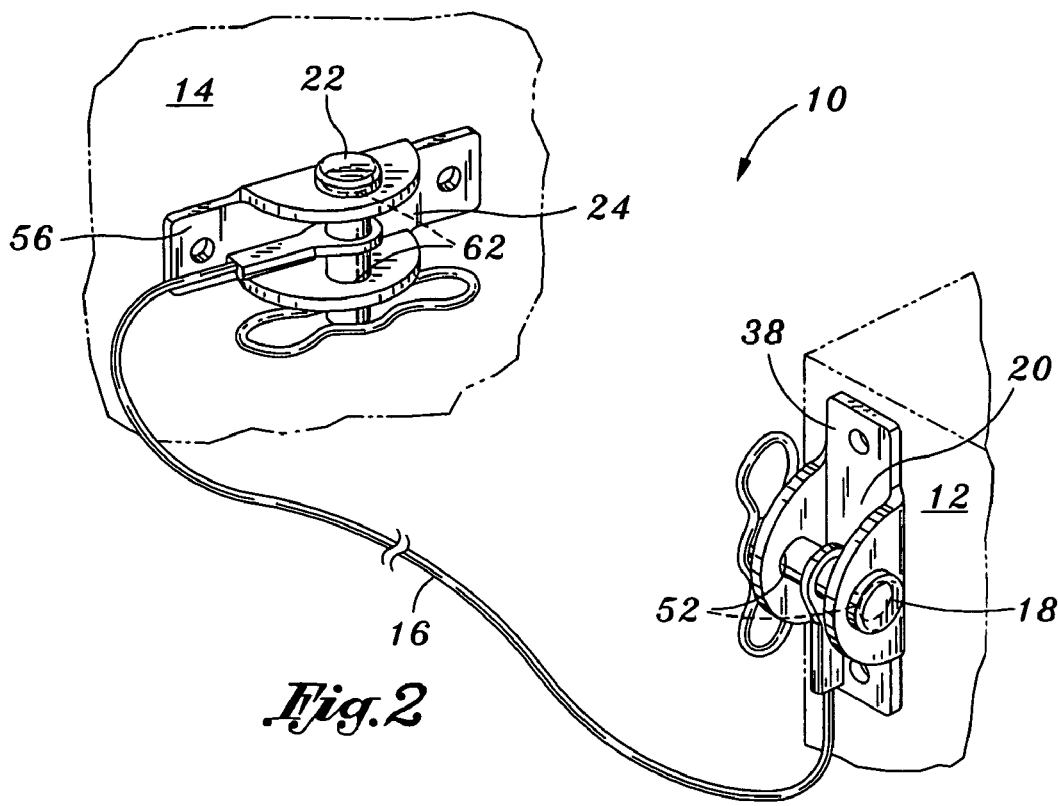
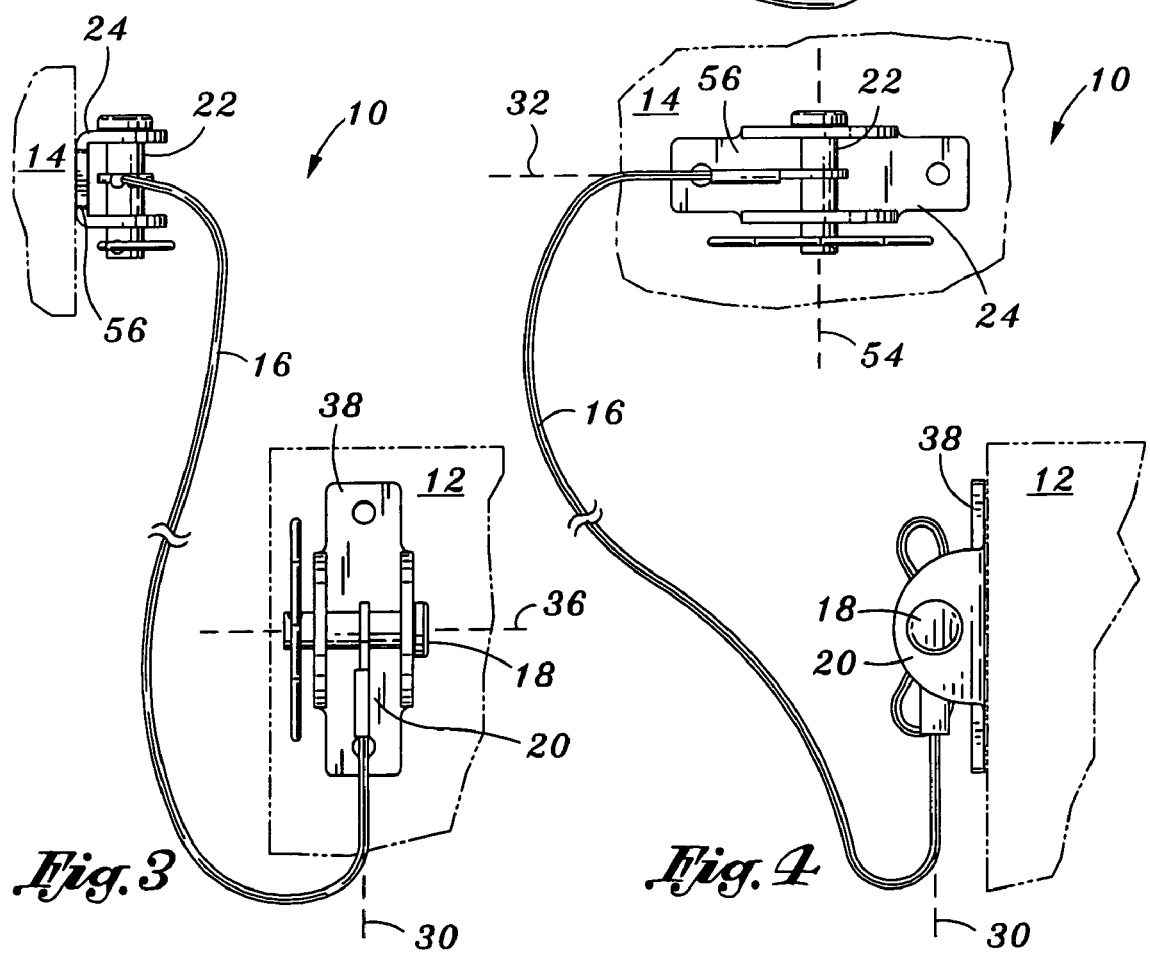

ANTI-TIPOVER DEVICE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention pertains generally to object stabilization equipment, and more particularly, to a uniquely configured anti-tipover device utilizing a pivotal coupling for mitigating the torque placed on the device while supporting an object adjacent a structure.

Anti-tipover devices are used in many settings to ensure the safety of individuals and the protection of the objects to be stabilized. For example, a hotel may use anti-tipover devices on furniture in its rooms in order to protect any guests from furniture tipover. This concern is of particular importance when considering the likelihood that children might climb the furniture or other objects within the hotel room. It may not be uncommon for children to scale opened drawers of furniture in an effort to reach towards the top of the furniture or to reach something located on top of the furniture. In such cases, an accident may have harmful effects for the guests, as well as detrimental consequences for the hotel. Homeowners may share similar concerns for themselves and for their children which may persuade the homeowners to use anti-tipover devices to prevent tipover accidents. Further, in regions affected by earthquakes, homeowners may take measures to stabilize and protect the objects so that such objects are not damaged as a result of earthquake sway and vibration. These measures often include stabilizing furniture, bookshelves, and other heavy objects, so that these objects do not tip over in the event of an earthquake.

Normally, anti-tipover devices will simply "tie down" an object so that it will not tip over or move more than a specific distance. Such devices may include glue, to adhere the bottom of an object to a specific location in order to keep the object from moving. Other devices may include floor-mounted brackets to mount appliances to the ground to keep them from moving. There are several considerations when determining how to stabilize objects, and one must contemplate whether the connection of the device between the object and the stabilizing structure may be sufficient to support and protect the object.

One area of concern with regard to anti-tipover devices specifically relates to the effects that such devices may have on the object being supported as well as the supporting structure. For example, if a child climbs up a bookshelf, causing it to tip over, the device must be able to withstand the force of the falling bookshelf and arrest its fall. In this example, there are tremendous forces on the bookshelf where the anti-tipover device is connected. If the stabilization equipment is not properly configured, it may fail due to the forces of the falling bookshelf. In many instances, an anti-tipover device might be attached to a bookshelf with screws. Thus, an improperly configured device under such forces may import relatively high shear forces or produce large torques (i.e. bending forces) on the screws which may ultimately result in device failure. Additional factors to consider in the design of anti-tipover devices may include the ease with which such a device may be installed, the stabilization strength of the device, the tamper resistance of the device, as well as its aesthetic properties.

Currently, there are only a few configurations of anti-tipover devices that are used to stabilize objects in the event of an earthquake or when children climb thereon. One such prior art device is the "Mommy's Helper" Tip Resistant Furniture Safety Brackets manufactured by Top Supplies, Inc. This device incorporates a set of molded plastic brackets and a plastic strap. As understood, to install this device, one must use screws to mount a plastic bracket to a wall and another plastic bracket to the furniture. Both brackets must then be positioned within four inches of each other. Finally, one end of the plastic strap is threaded through both brackets and back into a tab formed on the other end of the plastic strap. Due to its configuration, this device only prevents tipovers during minor tremors, and may snap (i.e., mechanically fracture) during major tremors or when children climb on the furniture. Another deficiency of the device is that it only incorporates a touch-release securing tab to prevent the plastic strap from slipping out of the brackets. Significant swaying, contact made when other objects hit the plastic strap, or other foreseeable events common during earthquakes and child frivolities, may cause the touch-release securing tab to release the plastic strap and cause the entire mechanism to fail. Furthermore, the configuration may be problematic because the securing tab and the plastic strap may fail when subjected to the significant mechanical forces and part fatigue inherent in such applications. Finally, the configuration of the plastic strap in relation to the molded plastic brackets may be problematic because a torque may be generated at the screws which may result in significant torsional loading and potential failure of the bracket and screws.

Another prior art device, the "Quake Hold" Steel Furniture Cable manufactured by Trevco, utilizes two mountable metal flanges that connect to a wire cable. As understood, the flanges are bent at a 90 degree angle with holes drilled therethrough for mounting the flanges to furniture and a wall using screws, with another hole in each flange for connecting the wire cable. The wire cable is connected to the flanges by inserting a threaded distal end of the cable through the drilled hole of the flange and attaching a cap nut to the threaded distal end to secure the wire cable to the flange. However, due to its configuration, this device appears to unevenly distribute mechanical forces through the metal flanges onto the structure or object to which the flanges are mounted. Although initial mechanical failure of the device may not likely occur in the cable, mechanical failure may likely occur in the flanges. Thus, earthquake or child-created mechanical forces may cause the flanges to bend, resulting in flange fatigue and failure. Furthermore, these mechanical forces may produce significant shearing stresses and/or torques on the brackets and screws.

Thus, there exists a need in the art for an anti-tipover device that is adapted for maintaining an object adjacent a structure and which is configured for more evenly distributing a mechanical load through the device to mitigate the occurrence of mechanical fracture when children climb thereon or during earthquakes. Furthermore, there exists a need in the art for an anti-tipover device for maintaining an object adjacent a structure and which is configured for mitigating the generation of torque at the brackets and screws used to mount the anti-tipover device to an object and a structure.

BRIEF SUMMARY OF THE INVENTION

The present invention specifically addresses and alleviates the above-referenced deficiencies associated with the use of prior art furniture anti-tipover devices. More particularly, the present invention is an improved anti-tipover device configured for more evenly distributing a mechanical load through the device to mitigate the occurrence of mechanical fracture such as when children climb thereon or during earthquakes. As will be demonstrated below, the anti-tipover device of the present invention differs from the anti-tipover devices of the prior art in that it is configured for mitigating the generation of torque at the brackets and screws used to mount the anti-tipover device.

In accordance with an aspect of the present invention, there is provided an anti-tipover device for retaining an object adjacent a structure, which includes at least one elongate flexible link element, first and second pin elements, and first and second cable retaining members. The link element may be pivotally coupled to the first and second pin elements. The first and second pin elements may be coupled to the respective ones of the first and second cable retaining members. The first and second cable retaining members may be mounted to the respective ones of the object and the structure. The pivotal coupling of the link element to the first and second pin elements may mitigate the bending forces and torque at the cable retaining members.

In use, as mechanical forces pass through the link element, the pivotal coupling allows the link element to pivot about the first and second pin elements. For example, the anti-tipover device may be mounted to a wall and a bookshelf, and a child may climb upon the bookshelf, causing it to tip away from the wall. In such a case, as the distance between the bookshelf and the wall increases, the link element will become taut. As the link element becomes tauter, it may pivot about either the first or second pin element to mitigate bending forces on the first and second cable retaining members. Once the link element becomes fully taut, the full force of the falling bookshelf may pass through the link element as well as the first and second cable members. At that moment, because the pivotal movement of the link element has mitigated the bending forces on the first and second cable retaining members, the anti-tipover device may therefore mitigate the occurrence of mechanical fracture and the generation of torque at the first and second cable retaining members.

In accordance with an aspect of the present invention, the link element may include opposing first and second end sections. The first end section may define a first longitudinal axis. The second end section may define a second longitudinal axis. The first pin element may define a first rotational axis. The second pin element may define a second rotational axis. The first and second pin elements may be coupled to the respective ones of the first and second end sections of the link element with the first and second rotational axes being disposed perpendicularly to the respective ones of the first and second longitudinal axes. The first and second pin elements may be sized and configured with the respective ones of the first and second end sections being pivotable about the respective ones of the first and second rotational axes.

The first cable retaining member may include a first base and a pair of opposing first pin supports attached to the first base. The second cable retaining member may include a second base and a pair of opposing second pin supports attached to the second base. The first and second cable retaining members may be attached to the respective ones of the first and second pin elements with the first and second pin elements being disposed between the respective ones of the first and second pin supports. The first base may be mountable to the object, and the second base may be mountable to the structure.

In another aspect of the present invention, a method of retaining the object adjacent the structure is provided. The method may comprise the step of providing a bracket assembly. The bracket assembly may include the link element, the first pin element and the first cable retaining member. The first cable retaining member may include the first base and the pair of opposing first pin supports.

The step of providing a bracket assembly may further include coupling the link element to the first pin element. For example, the first pin element may be inserted through a first ring terminal which is distally disposed at the first end section of the link element; thus, the first ring terminal (and the first end section) may pivot about the first pin element. The first pin element may further be coupled to the first pin supports. In this manner, the link element may be pivotally coupled to the first cable retaining member. Therefore, when force is applied through the link element, the link element may pivot freely about the first pin element, thereby reducing torque forces exerted on the first cable retaining member.

The method may also include the step of mounting the first base of the bracket assembly to the object.

The method of retaining the object adjacent the structure may further include the step of providing a support assembly. The support assembly may include the second pin element and the second cable retaining member. The second cable retaining member may include the second base and the pair of opposing second pin supports.

The step of providing a support assembly may further include coupling the link element to the second pin element. For example, the second pin element may be inserted through a second ring terminal which is distally disposed at the second end section of the link element; thus, the second ring terminal (and the second end section) may pivot about the second pin element. The second pin element may further be coupled to the second pin supports. In this manner, the link element may be pivotally coupled to the second cable retaining member. Therefore, when force is applied through the link element, the link element may pivot freely about the second pin element, thereby reducing torque forces exerted on the second base.

The method may further include the step of mounting the second base of the support assembly to the object.

BRIEF DESCRIPTION OF THE DRAWINGS

An illustrative and presently preferred embodiment of the invention is shown in the accompanying drawings (with phantom lines depicting solely environmental structure which forms no part of the claimed device) in which:

FIG. 2 is a front perspective view of the anti-tipover device in an aspect of the invention illustrating the elongate flexible link element pivotally coupled to the first and second pin elements which are connected to the respective ones of the first and second cable retaining members;

FIG. 3 is a view of the anti-tipover device in an aspect of the invention illustrating the assembled anti-tipover device with a top plain view of the first cable retaining member and a side view of the second cable retaining member; and FIG. 4 is a view of the anti-tipover device in an aspect of the invention illustrating the assembled anti-tipover device with a side view of the first cable retaining member and a top plain view of the second cable retaining member.

DETAILED DESCRIPTION OF THE INVENTION

Figure 1:
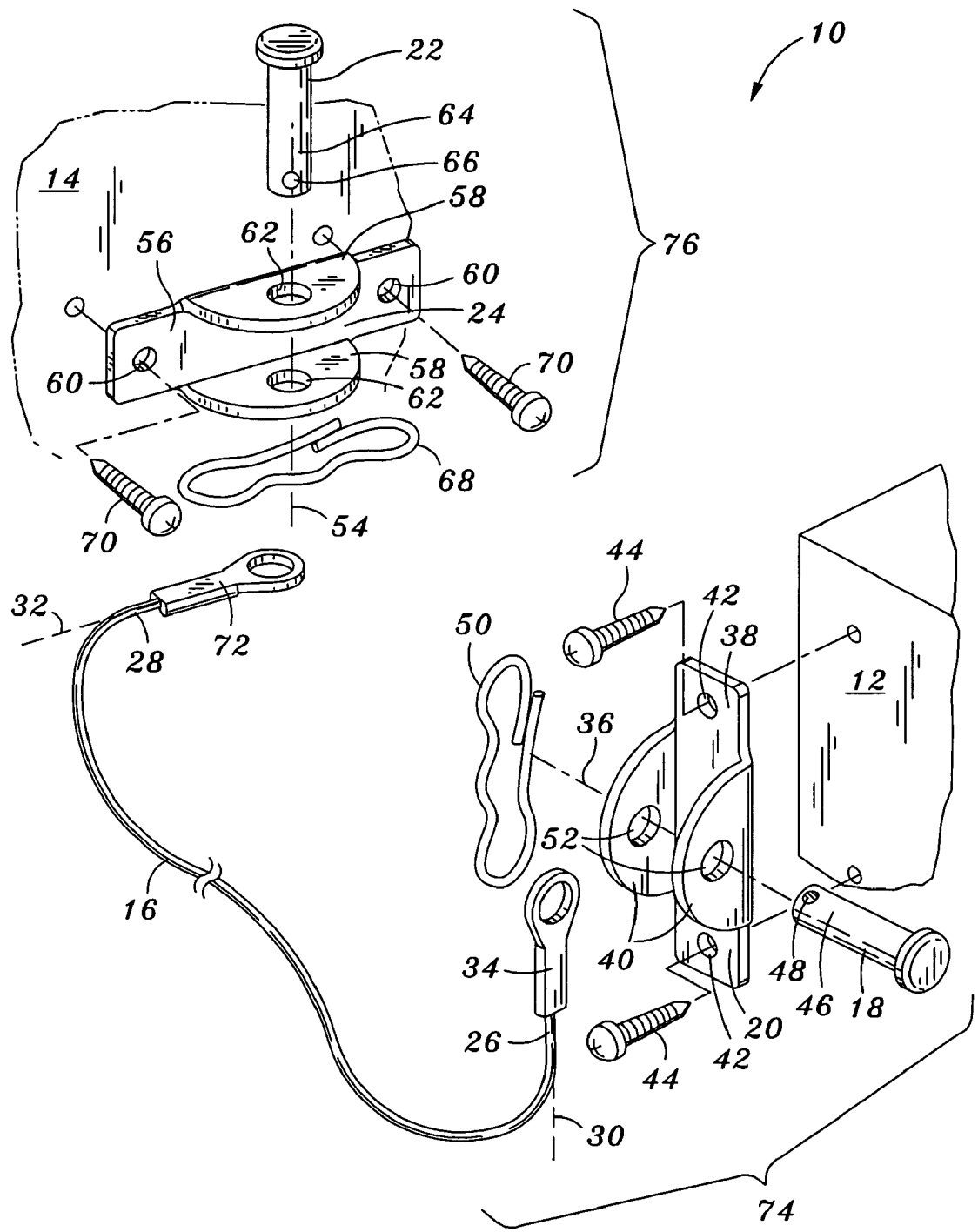
FIG. 1 is an exploded perspective view of an anti-tipover device illustrating the connective relationship of an elongate flexible link element with first and second pin elements, and first and second cable retaining members, as well as illustrating first and second rotational axes, about which the link element may pivot.

Referring now to the drawings wherein the showings are for purposes of illustrating preferred embodiments of the present invention only and not for purposes of limiting the same, FIG. 1 is an exploded front perspective view of an anti-tipover device 10 for maintaining an object 12 adjacent a structure 14, such as a wall. Although the present invention is disclosed according to its use with furniture, the anti-tipover device 10 may be used with any object 12 that is disposed adjacent to any structure 14. It is contemplated that the present invention may be used with lamps, vases, grandfather clocks, and other standing objects. Further, the structure 14 disclosed as part of the present invention may include ceilings, floors, or other free standing large objects suitable for stabilizing other smaller or less stable objects.

According to one aspect of the present invention, provided is the anti-tipover device 10 for retaining the object 12 adjacent the structure 14, the anti-tipover device 10 including: an elongate flexible link element 16 including opposing first and second end sections 26, 28, the first end section 26 defining a first longitudinal axis 30, and the second end section 28 defining a second longitudinal axis 32; a first pin element 18 defining a first rotational axis 36, the first pin element 18 being coupled to the first end section 26 with the first rotational axis 36 disposed perpendicular to the first longitudinal axis 30, the first pin element 18 being sized and configured with the first end section 26 being pivotable about the first pin element 18; a first cable retaining member 20 including a first base 38 and a pair of opposing first pin supports 40 attached to the first base 38, the first cable retaining member 20 being attached to the first pin element 18 with the first pin element 18 disposed between the first pin supports 40, the first base 38 being mountable to the object 12; a second pin element 22 defining a second rotational axis 54, the second pin element 22 being coupled to the second end section 28 with the second rotational axis 54 disposed perpendicular to the second longitudinal axis 32, the second pin element 22 being sized and configured with the second end section 28 being pivotable about the second pin element 22; and a second cable retaining member 24 including a second base 56 and a pair of opposing second pin supports 58 attached to the second base 56, the second cable retaining member 24 being attached to the second pin element 22 with the second pin element 22 disposed between the second pin supports 58, the second base 56 being mountable to the structure 14.

The anti-tipover device 10 includes at least: the link element 16, the first pin element 18, the first cable retaining member 20, the second pin element 22, and the second cable retaining member 24. The link element 16 may be configured as a wire cable, but it is also contemplated that the link element 16 may be configured as a spring or a nylon strap.

As shown in FIG. 1, the link element 16 may include the opposing first and second end sections 26, 28. The first end section 26 may define the first longitudinal axis 30, as shown by center lines in FIGS. 1, 3, and 4. The second end section 28 may define the second longitudinal axis 32, as shown by center lines in FIGS. 1 and 4. Referring again to FIG. 1, the first end section 26 may include a distally disposed first ring terminal 34; similarly, the second end section 28 may include a distally disposed second ring terminal 72.

In one embodiment of the present invention, the link element 16 may be pivotally coupled at both the first and second end sections 26, 28; however, it is contemplated that the link element 16 may be pivotally coupled to at least the first pin element 26.

The first pin element 18 may define the first rotational axis 36, as shown by center lines in FIG. 1. As shown in FIG. 3, the first pin element 18 may be coupled to the first end section 26 with the first rotational axis 36 being disposed perpendicular to the first longitudinal axis 30. In this regard, the first longitudinal axis 30 may be defined as that section of the link element 16 as it approaches the first pin element 18. Also, the first longitudinal axis 30 may not include that portion of the link element 16 which is curved or flexed in order to facilitate coupling with the first pin element 18.

Referring now to FIG. 4, the first pin element 18 may be sized and configured with the first end section 26 being pivotable about the first pin element 18. Thus, the perpendicular orientation of the first rotational axis 36 with respect to the first longitudinal axis 30 may be maintained even when the first end section 26 may include various distally-disposed geometries to facilitate a pivotal coupling with the first pin element 18.

In one embodiment of the present invention, as shown in FIG. 1, the first end section 26 of the link element 16 may include the distally disposed first ring terminal 34. Additionally, it is also contemplated that the first end section 26 of the link element 16 may include other distally-disposed geometries such as an elliptical loop, a snaphook, a knot, or the like, each of which may be formed to receive the first pin element 18 to allow pivotal motion of the link element 16 about the first rotational axis 36. Thus, as shown in FIG. 4, when the first pin element 18 is inserted through the first ring terminal 34, the first ring terminal 34 (and the first end section 26) may pivot about the first rotational axis 36.

Referring now to FIG. 1, the anti-tipover device 10 may further include the first cable retaining member 20. The first cable retaining member 20 may include the first base 38 and the pair of opposing first pin supports 40. The first pin supports 40 may be attached to the first base 38. However, it is contemplated that the first pin supports 40 may be attached to the first base 38 via a connector, e.g., via a dampening member for reducing the impact stress when a force is transmitted through the link element 16 to the first pin element 18. In an embodiment of the present invention, the first base 38 and the first pin supports 40 may be formed separate or integrally, with the first cable retaining member 20 being a single component and the first base 38 and the first pin supports 40 being aspects of the first cable retaining member 20. Thus, the first cable retaining member 20 may be configured with no clearly defined transition between the first base 38 and the first pin supports 40. In such a case, the first base 38 may be defined as the region which is interposed between the first pin supports 40. Additionally, the first base 38 may be defined as the region which is interposed between the distal portions of the first cable retaining member 20.

As shown in FIG. 2, the first base 38 may be mounted to the object 12. Referring briefly to FIGS. 2 and 4, the first base 38 may include at least one first screw hole 42 sized and configured to receive a first screw 44 therethrough for mounting the first base 38 to the object 12. Additionally, it is contemplated that the first base 38 may be mounted using a variety of other mechanical fasteners inserted through at least one first screw hole 42 of the base for mounting the first base 38 to the object 12. Alternatively, the first base 38 may be adhesively mounted to the object 12, or mounted through another joining process such as welding and the like.

Referring now to FIGS. 2 and 3, the first cable retaining member 20 may be attached to the first pin element 18. The first pin element 18 may be disposed between the first pin supports 40. In one embodiment, as shown in FIG. 1, the first pin supports 40 may include a coaxial set of first pin holes 52 wherethrough the first pin element 18 may be inserted. Thus, as shown in FIG. 2, the first pin element 18 may be coupled to the first pin holes 52 and simultaneously coupled to the first end section 26. The first ring terminal 34 may therefore be disposed between the first pin holes 52, and coupled to the first pin element 18. In this manner, the link element 16 may pivot about the first rotational axis 36 while being connected to the first cable retaining member 20. In this manner, force through the link element 16 may be more evenly distributed to the first base 38 due to the free pivotable motion of the first end section 26 about the first rotational axis 36. Thus, in an embodiment of the present invention, the anti-tipover device 10 may be configured with the pivotable coupling of the first end section 26 to the first pin element 18 mitigating a bending moment of the first cable retaining member 20 about the first screw(s) 44 and the first base 38.

Referring to FIG. 1, the first pin element 18 may include a first distal end 46 with a first hole 48 being formed therethrough. The anti-tipover device 10 may further include a first cotter element 50. The first cotter element 50 may be extended through the first hole 48 of the first pin element 18 for retaining the first pin element 18 coupled with the first cable retaining member 20. The process of coupling the first pin element 18 to the first cable retaining member 20 may include inserting the first pin element 18 through the first pin supports 40. Once fully coupled the with first pin supports 40, the first cotter element 50 may be inserted into the first hole 48 of the first pin element 18, thus retaining the first pin element 18 coupled with the first cable retaining member 20, as shown in FIG. 2. It is contemplated that the first cotter element 50 may be a bowtie cotter pin, as shown in FIGS. 1–4, and the first pin element 18 may be a headed clevis pin, as shown in FIGS. 1–4. Thus, as shown in FIG. 2, in one embodiment of the present invention, a bowtie cotter pin may be used to maintain the coupling of a headed clevis pin to the first pin supports 40.

The second pin element 22 may define the second rotational axis 54, as shown by center lines in FIG. 1. As shown in FIG. 4, the second pin element 22 may be coupled to the second end section 28 with the second rotational axis 54 being disposed perpendicularly to the second longitudinal axis 32. In this regard, the second longitudinal axis 32 may be defined as that section of the link element 16 as it approaches the second pin element 18. Also, the second longitudinal axis 32 may not include that portion of the link element 16 which is curved or flexed in order to facilitate coupling with the second pin element 22.

Referring now to FIG. 3, the second pin element 22 may be sized and configured with the second end section 28 being pivotable about the second pin element 22. Thus, the perpendicular orientation of the second rotational axis 54 with respect to the second longitudinal axis 32 may be maintained even when the second end section 28 may include various distally-disposed geometries to facilitate a pivotal coupling with the second pin element 22.

In one embodiment of the present invention, as shown in FIG. 1, the second end section 28 of the link element 16 may include the distally disposed second ring terminal 72. Additionally, it is also contemplated that the second end section 28 of the link element 16 may include other distally-disposed geometries such as an elliptical loop, a snaphook, a knot, or the like, each of which may be formed to receive the second pin element 22 in order to allow pivotable motion of the link element 16 about the second rotational axis 54. Thus, as shown in FIG. 3, when the second pin element 22 is inserted through the second ring terminal 72, the second ring terminal 72 (and the second end section 28) may pivot about the second rotational axis 54.

Referring now to FIG. 1, the anti-tipover device 10 may further include the second cable retaining member 24. The second cable retaining member 24 may include the second base 56 and the pair of opposing second pin supports 58. The second pin supports 58 may be attached to the second base 56. However, it is also contemplated that the second pin supports 58 may be attached to the second base 56 via a connector, e.g., via a dampening member for reducing the impact stress when a force is transmitted through the link element 16 to the second pin element 22. In an embodiment of the present invention, the second base 56 and the second pin supports 58 may be formed separate or integrally, with the second cable retaining member 24 being a single component and the second base 56 and the second pin supports 58 being aspects of the second cable retaining member 24. Thus, the second cable retaining member 24 may be configured with no clearly defined transition between the second base 56 and the second pin supports 58. In such a case, the second base 56 may be defined as the region which is interposed between the second pin supports 58. Additionally, the second base 56 may be defined as the region which is interposed between the distal portions of the second cable retaining member 24.

As shown in FIG. 2, the second base 56 may be mounted to the structure 14. Referring briefly to FIGS. 2 and 3, the second base 56 may include at least one second screw hole 60 sized and configured to receive a second screw 70 therethrough for mounting the second base 56 to the structure 14. Additionally, it is contemplated that the second base 56 may be mounted using a variety of other mechanical fasteners inserted through at least one second screw hole 60 of the base for mounting the second base 56 to the structure 14. Alternatively, the second base 56 may be adhesively mounted to the structure 14, or mounted using other joining processes such as welding and the like.

Referring now to FIGS. 2 and 4, the second cable retaining member 24 may be attached to the second pin element 22. The second pin element 22 may be disposed between the second pin supports 58. In one embodiment, as shown in FIG. 1, the second pin supports 58 may include a coaxial set of second pin holes 62 wherethrough the second pin element 22 may be inserted. Thus, as shown in FIG. 2, the second pin element 22 may be coupled with the second pin holes 62 and simultaneously coupled to the second end section 28. The second ring terminal 72 may therefore be disposed between the second pin holes 62, and coupled to the second pin element 22. In this manner, the link element 16 may pivot about the second rotational axis 54 while being connected to the second cable retaining member 24. In this manner, force through the link element 16 may be more evenly distributed to the second base 56 due to the free pivotable motion of the second end section 28 about the second rotational axis 54. Thus, in an embodiment of the present invention, the anti-tipover device 10 may be configured with the pivotable coupling of the second end section 28 to the second pin element 22 mitigating a bending moment of the second cable retaining member 24 about the second screw(s) 70 and the second base 56.

Referring to FIG. 1, the second pin element 22 may include a second distal end 64 with a second hole 66 being formed therethrough. The anti-tipover device 10 may further include a second cotter element 68. The second cotter element 68 may be extended through the second hole 66 of the second pin element 22 for retaining the second pin element 22 coupled with the second cable retaining member 24. The process of coupling the second pin element 22 to the second cable retaining member 24 may include inserting the second pin element 22 through the second pin supports 58. Once fully coupled with the second pin supports 58, the second cotter element 68 may be inserted into the second hole 66 of the second pin element 22, thus retaining the second pin element 22 coupled with the second cable retaining member 24, as shown in FIG. 2. It is contemplated that the second cotter element 68 may be a bowtie cotter pin, as shown in FIGS. 1–4, and the second pin element 22 may be a headed clevis pin, as shown in FIGS. 1–4. Thus, as shown in FIG. 2, in one embodiment of the present invention, a bowtie cotter pin may be used to maintain the coupling of a headed clevis pin to the second pin supports 58.

In another aspect of the present invention, there is provided a method of retaining the object 12 adjacent the structure 14. The method may include the step of providing a bracket assembly 74. The bracket assembly 74 may include the link element 16, the first pin element 18 and the first cable retaining member 20. The first cable retaining member 20 may include the first base 38 and the pair of opposing first pin supports 40.

The method may include the step of mounting the first base 38 of the bracket assembly 74 to the object 12. The first base 38 may be adhesively mounted. However, the first base 38 may also include at least one first screw hole 42 sized and configured to receive a first screw 44 therethrough for mounting the first base 38 to the object 12. It is also contemplated that the first base 38 may be mounted to the object 12 utilizing a variety of other mechanical fasteners such as nails. In addition, other joining processes may be used such as welding and the like.

The step of providing a bracket assembly 74 may further include coupling the link element 16 to the first pin element 18. For example, the first pin element 18 may be inserted through the first ring terminal 34 which is distally disposed at the first end section 26 of the link element 16; thus, the first ring terminal 34 (and the first end section 26) may pivot about the first pin element 18. The first pin element 18 may further be coupled to the first pin supports 40. In this manner, the link element 16 may be pivotally coupled to the first cable retaining member 20. Therefore, when force is applied through the link element 16, the link element 16 may pivot freely about the first pin element 18, thereby reducing torque forces exerted on the first cable retaining member 20.

In another aspect of the present invention, the method of retaining an object 12 adjacent a structure 14 may further include the step of providing a support assembly 76. The support assembly 76 may include the second pin element 22 and the second cable retaining member 24. The second cable retaining member 24 may include the second base 56 and the pair of opposing second pin supports 58.

The step of providing a support assembly 76 may further include coupling the link element 16 to the second pin element 22. For example, the second pin element 22 may be inserted through the second ring terminal 72 which is distally disposed at the second end section 28 of the link element 16; thus, the second ring terminal 72 (and the second end section 28) may pivot about the second pin element 22. The second pin element 22 may further be coupled to the second pin supports 58. In this manner, the link element 16 may be pivotally coupled to the second cable retaining member 24. Therefore, when force is applied through the link element 16, the link element 16 may pivot freely about the second pin element 22, thereby reducing torque forces exerted on the second base 56.

The method may further include the step of mounting the second base 56 of the support assembly 76 to the structure 14. The second base 56 may be adhesively mounted. However, the second base 56 may also include at least one second screw hole 60 sized and configured to receive a second screw 70 therethrough for mounting the second base 56 to the structure 14. It is also contemplated that the second base 56 may be mounted to the structure 14 utilizing a variety of other mechanical fasteners such as nails. In addition, other joining processes may be used such as welding and the like.

What is claimed is:

1. An anti-tipover device for retaining an object adjacent a structure, the anti-tipover device comprising:
   an elongate flexible link element including opposing first and second end sections, the first end section defining a first longitudinal axis, and the second end section defining a second longitudinal axis;
   a first pin element defining a first rotational axis, the first pin element being coupled to the first end section with the first rotational axis disposed perpendicular to the first longitudinal axis, the first pin element being sized and configured with the first end section being pivotable about the first pin element;
   a first cable retaining member including a first base and a pair of opposing first pin supports attached to the first base, the first cable retaining member being attached to the first pin element with the first pin element disposed between the first pin supports, the first base being mountable to the object;
   a second pin element defining a second rotational axis, the second pin element being coupled to the second end section with the second rotational axis disposed perpendicular to the second longitudinal axis, the second pin element being sized and configured with the second end section being pivotable about the second pin element; and
   a second cable retaining member including a second base and a pair of opposing second pin supports attached to the second base, the second cable retaining member being attached to the second pin element with the second pin element disposed between the second pin supports, the second base being mountable to the structure.

2. The anti-tipover device of claim 1 wherein the elongate flexible link element is a cable.

3. The anti-tipover device of claim 1 wherein the first and second end sections of the elongate flexible link element each include a distally disposed ring terminal, each of the ring terminals being formed to receive respective ones of the first and second pin elements therethrough.

4. The anti-tipover device of claim 1 wherein the first and second cable retaining members are integrally formed.

5. The anti-tipover device of claim 1 wherein the first and second bases are each adhesively mounted to respective ones of the object and the structure.

6. The anti-tipover device of claim 1 wherein the first and second bases each include at least one hole sized and configured to receive a screw therethrough for mounting the first and second bases to respective ones of the object and the structure.

7. The anti-tipover device of claim 1 wherein the first pin element includes a first distal end with a first hole being formed therethrough, the anti-tipover device further includes a first cotter element disposed through the first hole for retaining the first pin element coupled with the first cable retaining member, and the second pin element includes a second distal end with a second hole being formed therethrough, the anti-tipover device further includes a second cotter element disposed through the second hole for retaining the second pin element coupled with the second cable retaining member.

8. The anti-tipover device of claim 7 wherein the first and second cotter elements are bowtie cotter pins.

9. The anti-tipover device of claim 7 wherein the first and second pin elements are headed clevis pins.

10. A method of retaining an object adjacent a structure, the method comprising:
  a. providing a bracket assembly including:
    an elongate flexible link element including opposing first and second end sections, the first end section defining a first longitudinal axis, and the second end section defining a second longitudinal axis;
    a first pin element defining a first rotational axis, the first pin element being coupled to the first end section with the first rotational axis disposed perpendicular to the first longitudinal axis, the first pin element being sized and configured with the first end section being pivotable about the first pin element; and
    a first cable retaining member including a first base and a pair of opposing first pin supports attached to the first base, the first cable retaining member being attached to the first pin element with the first pin element disposed between the first pin supports, the first base being mountable to the object;
  b. mounting the first base of the bracket assembly to the object;
  c. providing a support assembly including:
    a second pin element defining a second rotational axis, the second pin element being coupled to the second end section of the elongate flexible link element with the second rotational axis disposed perpendicular to the second longitudinal axis, the second pin element being sized and configured with the second end section being pivotable about the second pin element; and
    a second cable retaining member including a second base and a pair of opposing second pin supports attached to the second base, the second cable retaining member being attached to the second pin element with the second pin element disposed between the second pin supports, the second base being mountable to the structure; and
  d. mounting the second base of the support assembly to the structure.

11. The method of claim 10 wherein the providing a bracket assembly step further includes coupling the first end section to the first pin element with the first rotational axis disposed perpendicular to the first longitudinal axis, the first pin element being disposed between the first pin supports.

12. The method of claim 10 wherein the providing a support assembly step further includes coupling the second end section to the second pin element with the second rotational axis disposed perpendicular to the second longitudinal axis, the second pin element being disposed between the second pin supports.

13. The method of claim 10 wherein the elongate flexible link element is a cable.

14. The method of claim 10 wherein the first and second end sections of the elongate flexible link element each include a distally disposed ring terminal, each of the ring terminals being formed to receive respective ones of the first and second pin elements therethrough.

15. The method of claim 10 wherein the first and second cable retaining members are integrally formed.

16. The method of claim 10 wherein the first and second bases are each adhesively mounted to respective ones of the object and the structure.

17. The method of claim 10 wherein the first and second bases each include at least one hole sized and configured to receive a screw therethrough for mounting the first and second bases to respective ones of the object and the structure.

18. The method of claim 10 wherein the first pin element includes a first distal end with a first hole being formed therethrough, the anti-tipover device further includes a first cotter element disposed through the first hole for retaining the first pin element coupled with the first cable retaining member; and the second pin element includes a second distal end with a second hole being formed therethrough, the anti-tipover device further includes a second cotter element disposed through the second hole for retaining the second pin element coupled with the second cable retaining member.

19. The method of claim 18 wherein the first and second cotter elements are bowtie cotter pins.

20. The method of claim 18 wherein the first and second pin elements are headed clevis pins.

* * * * *